Jan. 31, 1967  W. R. LULL  3,301,530
DAMPED BLADE
Filed Aug. 3, 1965

INVENTOR.
William R. Lull
BY
Paul Fitzpatrick
ATTORNEY 3,301,530
DAMPED BLADE
William R. Lull, Indianapolis, Ind., assignor to General
   Motors Corporation, Detroit, Mich., a corporation of
   Delaware
Filed Aug. 3, 1965, Ser. No. 476,816
6 Claims. (Cl. 253—77)

My invention relates generally to bladed machine elements such as the rotors of compressors, turbines and the like. Such machine elements comprise a body having a plurality of circumferentially spaced radially extending blades. During operation, the blades are subjected to relatively high forces because of the high rotational speed of the rotors and the flow of elastic fluid between the blades. These forces have a tendency to set up vibration in the blades. When the rotational speed of the rotor is an even multiple of the natural frequencies of vibration of the rotor, the amplitudes of the vibration become untenable causing blade fatigue and failure. In order to overcome this problem and decrease these harmful amplitudes, it is desirable that the blades be provided with some means to damp vibration during all operational speeds and especially during speeds within its natural frequency range. Accordingly, it is a general object of my invention to provide damping means for the blades of a bladed rotor such as a compressor, turbine, or the like.

Another object is to provide the blades of a bladed rotor with metallic coating to utilize the shear effects produced at the interface of the vibrating metallic layers to dissipate the vibrational energy.

Another object of my invention is to provide the metallic blades in a bladed rotor with a compliant metallic coating between the metallic blade and an outer hard coating which creates shear stresses to dissipate the energy of vibration.

Another object is to provide damping means for the blades in a bladed rotor wherein a compliant metallic coating between the blade metal and an outer corrosive resistant coating dissipates the energy of vibration by producing shear effects at the interface between the compliant coating and the blade and between the compliant coating and the outer coating.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
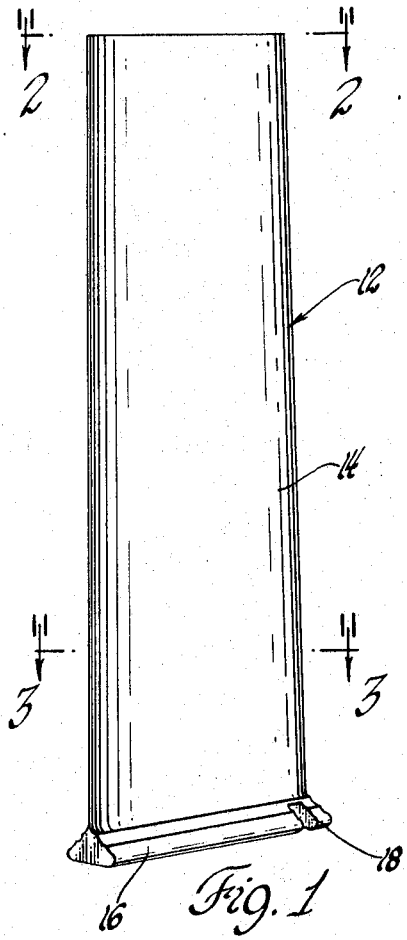
FIGURE 1 is an elevation view of a rotor blade in accordance with my invention.
Figure 2:
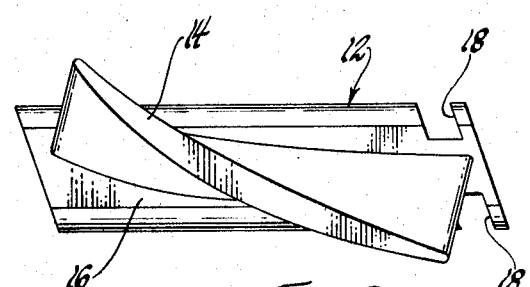
FIGURE 2 is a plan view of a rotor blade in accordance with my invention.

More particularly, FIGURE 1 shows a rotor blade indicated generally at 12 comprising an airfoil section 14 and a root section 16. The root section 16 is dovetailed and adapted to be received by an axial slot in a rotor in the conventional manner. A locking slot 18 is cut out of the root section 16 to retain the blade 12 assembled within the axial slot of the rotor. The locking slots 18 are best shown in FIGURE 2.

Figure 3:
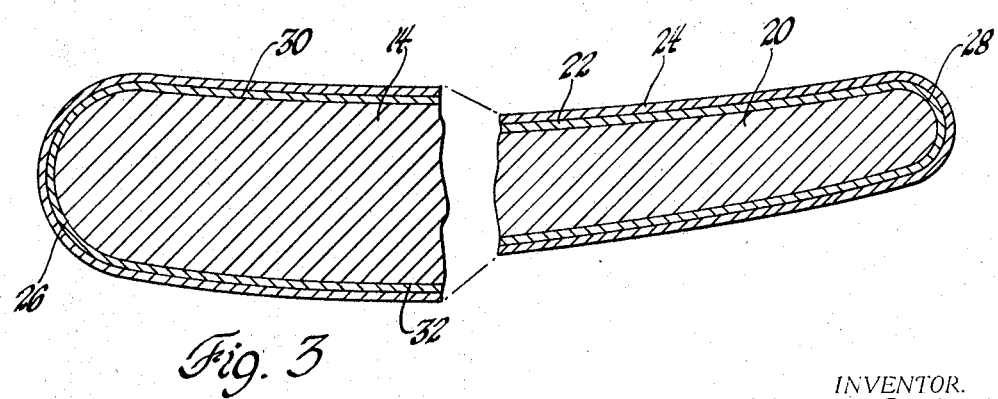
FIGURE 3 is a section taken along the line 3—3 of FIGURE 1 and looking in the direction of the arrows.

Referring now to FIGURE 3, it can be seen that the airfoil section 14 comprises a metallic base 20 and inner and outer coatings 22 and 24, respectively. The base 20 is of airfoil cross section and comprises a leading edge portion 26 and a trailing edge portion 28. The leading edge 26 and the trailing edge 28 are connected by a pair of lateral surfaces 30 and 32 which are contiguous with the leading and trailing edges such as to form a smooth cylinder of airfoil cross section. The base 20 is metallic and may be made of any metal suitable for use in bladed rotors. The only requirement is that the blade base metal have a relatively high modulus of elasticity. An example of a suitable metal is steel which has a modulus of elasticity in the neighborhood of 29.0(10)6.

The entire surface of the metal blade 20 is shown as being coated with a compliant coating 22 of substantially constant thickness. This coating is relatively soft and has a lower modulus of elasticity. An example of the coating 22 would be copper which has a modulus of elasticity in the neighborhood of 15.6(10)6. Coated on the outer surface of the compliant copper coating is a second coating 24. The coating 24 is also metallic and has a relatively high modulus of elasticity so that the coated blade comprises three layers with the middle layer being a compliant material having a relatively low modulus of elasticity. In addition to providing an outer coating 24 of a high modulus of elasticity, it may be desirable from a durability standpoint to choose a metal which is also corrosion resistant. An example of a metal which meets both of these requirements is chromium. Chromium has a modulus of elasticity in the neighborhood of 36.0(10)6 and is highly corrosion resistant. The outer coating then has as high as or a higher modulus of elasticity than the metal in the base 20.

I have found that when a typical blade having a maximum thickness of 0.25 inch near its base and a maximum thickness of 0.094 inch near its tip is completely coated with 0.020 inch of copper and subsequently coated with 0.005 inch of chromium, the logarithmic decrement of damping is about 1.6%. This is twice the damping effect experienced with the copper coating only. This latter value was found to be about 0.8%. With these results in mind, the manner in which damping is accomplished will now be explained.

As the blade vibrates, it vibrates as a cantilevered blade since the root section 16 is fixed in a rotor. As the blade then vibrates about this fixed base, it experiences cyclic bending. When this occurs, the metal in each layer experiences cyclic elongation under the bending loads. Since in my invention, the metals at each interface have different moduli of elasticity, their respective elongations are different with the result that shear stresses are produced at the interfaces of the layers, that is, at the interface of compliant coating 22 and the base metal 20 and at the interface of the compliant coating 22 and the outer coating 24. The shear stresses absorb energy and damp the vibration. With the vibration energy being dissipated, the vibrational amplitudes are decreased and brought within the reasonable limits to increase the fatigue life of the blade. With my blade damping, it is also possible to have the bladed rotor operate at its natural frequency for limited periods of time.

Recalling the above statistics, it becomes readily apparent that the use of two coatings doubles the damping effects since shear stresses are produced at two interfaces under cyclic bending to dissipate the vibrational energy. As previously stated, with only a copper coating, I experienced a logarithmic decrement of damping of only about 0.8% whereas when the 0.020 inch of copper was overcoated with 0.005 inch of chromium, the logarithmic decrement of damping doubled to 1.6%. Generally, I have found an increase in the thickness of the compliant copper coating will result in increased damping whereas it appears that an increase in the thickness of the chromium coating will not increase the damping and may even diminish it a slight amount. Also in theory at least, the entire surface of the airfoil need not be coated as the coatings would be most effective at the maximum stress areas of the blade. In rotor blades, these maximum stress areas would occur near its base. In such an application, it would require that only the base portion of the airfoil section be coated in accordance with my invention.

Thus it can be seen that I have provided blade damping by utilizing the shear effects at the interfaces of a pair of vibrating layers having different moduli of elasticity to dissipate the vibrational energy.

While I have discussed my blade damping coatings in connection with rotor blades, the principles of my invention are obviously equally applicable to stator blades or to any metallic panel subject to vibration. Likewise, many modifications and variations of the present invention are possible in the light of the above teachings. It is, therefore, to be understood that within the scope of the appended claims, the invention may be practiced otherwise than as specifically described.

I claim:

1. In a damping means for metallic rotor blades and the like, the combination comprising:
   a first metallic layer coated on said blade, said first metallic layer being of a metal which has a lower modulus of elasticity than the metal in said blade, said layer being at least 0.02 inch in thickness, and
   a second metallic layer coated on said first metallic layer, said second metallic layer being of a metal which has a higher modulus of elasticity than the metal in said first layer, said second layer being at least 0.005 inch in thickness whereby vibration of the blade produces shear stresses at the interfaces between said blade and said first layer and between said first and second layers to dissipate the energy of vibration to damp said vibration.

2. In a damping means for metallic rotor blades and the like, the combination comprising:
   a first metallic layer coated on said blade, said first metallic layer being of a metal which has a lower modulus of elasticity than the metal in said blade, said layer being at least 0.02 inch in thickness, and
   a second metallic layer coated on said first metallic layer, said second metallic layer being of a metal which has a modulus of elasticity which is higher than the modulus of elasticity of the metal in said first layer and at least as high as the modulus of elasticity of the metal in said blade, said second layer being at least 0.005 inch in thickness whereby vibration of the blade produces shear stresses at the interfaces between said blade and said first layer and between said first and second layers to dissipate the energy of vibration to damp said vibration.

3. In a damping means for a rotor blade or the like of a metal having a modulus of elasticity which is higher than the modulus of elasticity of copper and lower than the modulus of elasticity of chromium, the combination comprising:
   a first layer of copper coated on said blade, and
   a hard layer of chromium coated on said first metallic layer whereby vibration of the blade produces shear stresses at the interfaces between the blade and the copper layer and between the copper and chromium layers to dissipate the energy of vibration to damp said vibration.

4. The damping means as defined in claim 3 wherein said copper layer has a thickness of at least 0.02 inch.

5. The damping means as defined in claim 3 wherein said copper layer has a thickness of at least 0.02 inch and said chromium layer has a thickness of at least 0.005 inch.

6. The damping means as defined in claim 3 wherein said copper layer has a thickness of approximately 0.02 inch and said chromium layer has a thickness of approximately 0.005 inch.

References Cited by the Examiner

UNITED STATES PATENTS 2,719,095  9/1955  Scanlan.
3,240,572  3/1966  Faber _____ 253—77 X EDGAR W. GEOGHEGAN, *Primary Examiner.*

EVERETTE A. POWELL, JR., *Examiner.*